US006201067B1

(12) United States Patent
Cheung et al.

(10) Patent No.: US 6,201,067 B1
(45) Date of Patent: Mar. 13, 2001

(54) POLYMERIC BLEND COMPOSITIONS OF α-OLEFIN/VINYLIDENE AROMATIC MONOMER INTERPOLYMERS AND AROMATIC POLYETHERS

(75) Inventors: Yunwa W. Cheung; Martin J. Guest; Rak-Wing S. Chum; Che-I Kao, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/231,030

(22) Filed: Jan. 14, 1999

Related U.S. Application Data

(60) Provisional application No. 60/071,318, filed on Jan. 14, 1998.

(51) Int. Cl.[7] .............................. C08L 23/02; C08L 71/10
(52) U.S. Cl. ....................... 525/133; 525/92 D; 525/132; 525/152
(58) Field of Search .................................... 525/132, 133, 525/152

(56) References Cited

U.S. PATENT DOCUMENTS

| | | | | |
|---|---|---|---|---|
| 4,544,703 | * | 10/1985 | Haaf | 525/92 |
| 5,008,314 | * | 4/1991 | Lee | 524/143 |
| 5,703,187 | * | 12/1997 | Timmers | 526/282 |
| 5,739,200 | * | 4/1998 | Cheung | 524/504 |

* cited by examiner

Primary Examiner—Patricia A. Short

(57) ABSTRACT

The present invention relates to a blend comprising at least one interpolymer produced from polymerizing a monomer mixture comprising from about 5 to about 65 mole percent of (a) at least one vinylidene aromatic monomer, or (b) a combination of at least one vinylidene aromatic monomer and at least one hindered aliphatic vinylidene monomer, and from about 35 to about 95 mole percent of at least one aliphatic α-olefin having from about 2 to about 20 carbon atoms; and a composition comprising an aromatic polyether and optionally (a) at least one homopolymer of a vinylidene aromatic monomer, or (b) at least one interpolymer of one or more vinylidene aromatic monomers, or (c) at least one interpolymer of at least one vinylidene aromatic monomer and at least one hindered aliphatic vinylidene monomers, or (d) at least one of (a–c) further comprising an impact modifier, or (e) a combination of any two or more of the aromatic polyether and (a–d). The blend also comprises at least one optional impact modifier and at least one optional processing aid. The blend is useful in the preparation of fabricated articles such as adhesives, films, blow molded articles, and injection molded articles, and is characterized by improved high temperature serviceability.

13 Claims, No Drawings

POLYMERIC BLEND COMPOSITIONS OF α-OLEFIN/VINYLIDENE AROMATIC MONOMER INTERPOLYMERS AND AROMATIC POLYETHERS

CROSS REFERENCE TO RELATED APPLICATIONS

This application is a continuation application of provisional application No. 60/071318, filed Jan. 14, 1998, the disclosure of which is incorporated herein, in its entirety, by reference.

FIELD OF THE INVENTION

The present invention relates to a blend comprising at least one interpolymer produced from polymerizing a monomer mixture comprising from about 5 to about 65 mole percent of (a) at least one vinylidene aromatic monomer, or (b) a combination of at least one vinylidene aromatic monomer and at least one hindered aliphatic vinylidene monomer, and from about 35 to about 95 mole percent of at least one aliphatic α-olefin having from about 2 to about 20 carbon atoms; and a composition comprising an aromatic polyether and optionally (a) at least one homopolymer of a vinylidene aromatic monomer, or (b) at least one interpolymer of one or more vinylidene aromatic monomers, or (c) at least one interpolymer of at least one vinylidene aromatic monomer and at least one hindered aliphatic vinylidene monomers, or (d) at least one of (a–c) further comprising an impact modifier, or (e) a combination of any two or more of the aromatic polyether and (a–d). The blend also comprises at least one optional impact modifier and/or at least one optional processing aid. The blend is useful in the preparation of fabricated articles such as adhesives, films, blow molded articles, and injection molded articles, and is characterized by improved high temperature serviceability.

BACKGROUND OF THE INVENTION

The present invention pertains to thermoplastic blends of α-olefin/hindered vinylidene monomer interpolymers and aromatic polyethers, such as poly(2,6-dimethyl-1,4-phenylene oxide). The blend components and their ratios were selected to provide materials having superior performance or processability or both.

The generic class of materials covered by α-olefin/hindered vinylidene monomer substantially random interpolymers and including materials such as α-olefin/vinyl aromatic monomer interpolymers are known in the art and offer a range of material structures and properties which makes them useful for varied applications, such as compatibilizers for blends of polyethylene and polystyrene as described in U.S. Pat. No. 5,460,818, the disclosure of which is incorporated herein by reference.

Although of these interpolymers are of important utilities in their own right, the plastic designers, chemists and engineers are constantly seeking to improve and expand the applicability of these interpolymers. There is a need to provide materials based on α-olefin/vinylidene aromatic monomer interpolymers with superior performance characteristics, including upper use service temperature, compared to unmodified polymers, which will further expand the utility of this interesting class of materials.

Further, aromatic polyethers, such as poly(2,6-dimethyl-1,4-phenylene oxide, which is more commonly known as polyphenylene ether(PPE), are well-known engineering thermoplastics possessing relatively high softening points. However, these polymer generally suffer from poor impact resistance and poor processability. Although polymer additives such as polystyrene or high impact polystyrene can be used to improve the processing performance of aromatic polyethers, it is often necessary to utilize others polymers such as styrene/butadiene/styrene block copolymers to achieve desirable performance. In contradistinction to known practices, the present invention makes use of the unexpected compatibility of α-olefin/vinylidene aromatic monomer interpolymers with aromatic polymers such as, for example, polyphenylene ether(PPE) to provide thermoplastic compositions with improved and expanded practical utility.

The present invention pertains to a blend of polymeric materials comprising (A) from about 1 to about 99 weight percent based on the combined weight of components (A) and (B) of at least one interpolymer produced from polymerizing a monomer mixture comprising:
  (1) from about 5 to about 65 mole percent of (a) at least one vinylidene aromatic monomer, or (b) a combination of at least one vinylidene aromatic monomer and at least one hindered aliphatic vinylidene monomer, and
  (2) from about 35 to about 95 mole percent of at least one aliphatic α-olefin having from about 2 to about 20 carbon atoms; and
(B) from about 1 to about 99 weight percent based on the combined weight of components (A) and (B) of a composition comprising:
  (1) from about 1 to about 100 weight percent based on the combined weight of components (B1) and (B2) of an aromatic polyether; and
  (2) from 0 to about 99 weight percent based on the combined weight of components (B1) and (B2) of
    (a) at least one homopolymer of a vinylidene aromatic monomer, or
    (b) at least one interpolymer of one or more vinylidene aromatic monomers, or
    (c) at least one interpolymer of at least one vinylidene aromatic monomer and at least one hindered aliphatic vinylidene monomers, or
    (d) at least one of (B1) or (B2)(a–c) further comprising an impact modifier, or
    (e) a combination of any two or more of (B1) and (B2)(a–d),
  (c) from 0 to about 50 weight percent of at least one optional impact modifier, and
(D) from 0 to about 50 weight percent of at least one optional processing aid.

When the polymer blend contains from about 50 to about 99 weight percent of the interpolymer component (A), the invention provides for thermoplastic interpolymer compositions having improved thermal performance, while retaining desirable mechanical properties.

When the polymer blend contains from about 1 to about 50 weight percent of the interpolymer component (A), the invention provides for polymer compositions having improved toughness and processability while retaining desirable mechanical properties.

Another aspect of the present invention pertains to such polymer compositions in the form of a film or sheet, or as a component of a multilayered structure resulting from calendering, blowing, casting or extrusion or coextrusion operations.

Another aspect of the present invention pertains to such polymer compositions and their utility in the form of foams, fibers or emulsions.

Another aspect of the present invention pertains to the utilization of such polymer compositions in adhesives, adhesive formulations and adhesive or sealant applications.

Another aspect of the present invention pertains to injection, compression, extruded or blow molded parts prepared from such polymer compositions.

DETAILED DESCRIPTION OF THE INVENTION

With reference to chain microstructure or comonomer sequencing, suitable component (A) interpolymers include random, alternating and substantially random varieties, the latter being inclusive of pseudo-random. Preferably, the component (A) interpolymer is an alternating or substantially random interpolymer, and most preferably substantially random.

The blends of the present invention, when desired, can be free of any component, compound or substituents not specifically enumerated herein.

The blends of the present invention can comprise, consist essentially of or consist of any two or more of such interpolymers or polymers enumerated herein. Likewise, the interpolymers or polymers can comprise, consist essentially of or consist of one or more of the polymerizable monomer(s) enumerated herein.

The term "interpolymer" is used herein to indicate a polymer wherein at least two different monomers are polymerized. That is, the polymer contains a plurality of polymerized monomers as two, three, four and so on.

The term "copolymer" as employed herein means a polymer wherein at least two different monomers are polymerized to form the copolymer. Thus, as used herein, there is overlap between the terms "interpolymer" and "copolymer" as, herein, both terms can refer to a polymer comprised of, for example, three polymerized monomers.

The term "mer(s)" means the polymerized unit of the polymer derived from the indicated monomer(s).

The term "monomer residue" or "residue" means that portion of the polymerizable monomer molecule which resides in the polymer chain as a result of being polymerized with another polymerizable molecule to make the polymer chain.

Suitable "pseudo-random" interpolymers are described in U.S. Pat. No. 5,703,187, the disclosure of which is incorporated herein in its entirety by reference.

Suitable "alternating" interpolymers are those in which the aliphatic alpha-olefin monomer (A) and hindered vinylidene monomer (B) occur in repeat alternate sequences on the polymer chain in atactic or stereospecific structures (such as isotactic or syndiotactic) or their combinations of general formula $(AB)_n$.

Suitable "random" interpolymers are those in which the monomer units are incorporated into the chain wherein can there exist various combination of ordering including blockiness where either the aliphatic alpha-olefin monomer (A) or hindered vinylidene monomer (B) or both can be repeated adjacent to one another.

As indicated above, substantially random ethylene/vinyl aromatic interpolymers are especially preferred ethylene polymers for use in the present invention. Representative of substantially random ethylene/vinyl aromatic interpolymers are substantially random ethylene/styrene interpolymers.

A substantially random interpolymer comprises in polymerized form i) one or more α-olefin monomers; ii) one or more vinyl or vinylidene aromatic monomers, or one or more sterically hindered aliphatic or cycloaliphatic vinyl or vinylidene monomers, or both; and optionally iii) other polymerizable ethylenically unsaturated monomer(s).

The term "substantially random" in the substantially random interpolymer resulting from polymerizing i) one or more α-olefin monomers; ii) one or more vinyl or vinylidene aromatic monomers or one or more sterically hindered aliphatic or cycloaliphatic vinyl or vinylidene monomers, or both; and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method,* Academic Press New York, 1977, pp. 71–78, the disclosure of which is incorporated herein by reference. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree (greater than 50 mol %) of either isotacticity or syndiotacticity. This means that in the carbon⁻13 NMR spectrum of the substantially random interpolymer, the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, (α-olefin monomers containing from about 2 to about 20, preferably from about 2 to about 12, more preferably from about 2 to about 8 carbon atoms. Preferred such monomers include ethylene, propylene, butene-1,4-methyl-1-pentene, hexene-1 and octene-1. Most preferred are ethylene or a combination of ethylene with $C_3$–$C_8$ α-olefins. These α-olefins do not contain an aromatic moiety.

Suitable vinyl or vinylidene aromatic monomers which can be employed to prepare the substantially random interpolymer include, for example, those represented by the following formula:

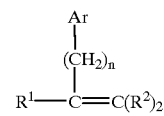

wherein $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; Ar is a phenyl group or a phenyl group substituted with from about 1 to about 5 substituents selected from the group consisting of halo, $C_{1-4}$-alkyl, and $C_{1-4}$-haloalkyl; and n has a value from zero to about 4, preferably from zero to about 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers", it is meant addition polymerizable vinyl or vinylidene monomers corresponding to the formula:

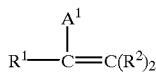

wherein $A^1$ is a sterically bulky, aliphatic or cycloaliphatic substituent of up to 20 carbons, $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; or alternatively $R^1$ and $A^1$ together form a ring system.

By the term "sterically bulky" is meant that the monomer bearing this substituent is normally incapable of addition polymerization by standard Ziegler-Natta polymerization catalysts at a rate comparable with ethylene polymerizations.

α-Olefin monomers containing from about 2 to about 20 carbon atoms and having a linear aliphatic structure such as ethylene, propylene, butene-1, hexene-1 and octene-1 are not considered to be sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers usually contain from about 5 to about 65, preferably from about 5 to about 55, more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of at least one aliphatic α-olefin having from about 2 to about 20 carbon atoms.

Other optional polymerizable ethylenically unsaturated monomer(s) include strained ring olefins such as norbornene and $C_{1-10}$alkyl or $C_{6-10}$-aryl substituted norbornenes, with an exemplary substantially random interpolymer being ethylene/styrene/norbornene.

The most preferred substantially random interpolymers are interpolymers of ethylene and styrene and interpolymers of ethylene, styrene and at least one α-olefin containing from about 3 to about 8 carbon atoms.

The number average molecular weight ($M_n$) of the substantially random interpolymers is usually greater than 5,000, preferably from about 20,000 to about 1,000,000, more preferably from 50,000 to 500,000. The glass transition temperature ($T_g$) of the substantially random interpolymers is preferably from about −40° C. to about +35° C., preferably from 0° C. to about +30° C., most preferably from about +10° C. to about +25° C., measured according to differential mechanical scanning (DMS).

In especially preferred embodiments, particularly preferred interpolymers (random, alternating and substantially random) has a polydispersity greater than 1.3 as determined using gel permeation chromatography (GPC).

The substantially random interpolymers may be modified by typical grafting, hydrogenation, functionalizing, or other reactions well known to those skilled in the art. The polymers may be readily sulfonated or chlorinated to provide functionalized derivatives according to established techniques. The substantially random interpolymers may also be modified by various chain extending or crosslinking processes including, but not limited to peroxide-, silane-, sulfur-, radiation-, or azide-based cure systems. A full description of the various cross-linking technologies is described in copending U.S. patent application Ser. Nos. 08/921,641 and 08/921,642, both filed on Aug. 27, 1997, the disclosures of both of which are incorporated herein by reference.

Dual cure systems, which use a combination of heat, moisture cure, and radiation steps, may also be effectively employed. Dual cure systems are disclosed and claimed in U.S. patent application Ser. No. 536,022, filed on Sep. 29, 1995, in the names of K. L. Walton and S. V. Karande, the disclosure of which is incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

One suitable method for manufacturing substantially random ethylene/viynl aromatic interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, the disclosures of which are incorporated herein in their entireties by reference. Preferred operating conditions for such polymerization reactions are pressures from atmospheric up to 3000 atmospheres and temperatures from about −30° C. to about 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos: 5,055,438; 5,057,475; 5,096,867; 5,064,802; 5,132,380; 5,189,192; 5,321,106; 5,347,024; 5,350,723; 5,374,696; 5,399,635; 5,470,993;

5,703,187; and 5,721,185, the disclosures of all of which are incorporated herein in their entireties by reference.

The substantially random ethylene/vinyl aromatic interpolymers can also be prepared by the methods described in JP 07/278230 (the disclosure of which is incorporated herein by reference) employing compounds shown by the general formula

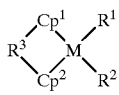

Where $Cp^1$ and $Cp^2$ are cyclopentadieny 1 groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random ethylene/vinyl aromatic interpolymers can also be prepared by the methods described by John G. Bradfute et al. (W. R. Grace & Co.) in WO 95/32095; by R. B. Pannell (Exxon Chemical Patents, inc.) in WO 94/00500; and in *Plastics Technology,* p. 25 (September 1992), the disclosures of which are incorporated herein by reference.

Also suitable are the substantially random interpolymers which comprise at least one α-olefin/vinyl aromatic/vinyl aromatic/α-olefin tetrad disclosed in U.S. application Ser. No. 08/708,869, filed Sep. 4, 1996, and WO 98/09999, both by Francis J. Timmers et al., the disclosures of which are incorporated herein by reference. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, such as, for example, an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula:

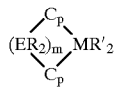

wherein each Cp is independently, each occurrence, a substituted cyclopentadienyl group π-bound to M; E is C or Si; M is a group IV metal, preferably zr or Hf, most preferably Zr; each R is independently, each occurrence, H, hydrocarbyl, silahydrocarbyl, or hydrocarbylsilyl, containing up to 30 preferably from about 1 to about 20 more preferably from about 1 to about 10 carbon or silicon atoms; each R' is independently, each occurrence, H, halo, hydrocarbyl, hyrocarbyloxy, silahydrocarbyl, hydrocarbylsilyl containing up to 30 preferably from about 1 to about 20 more preferably from about 1 to about 10 carbon or silicon atoms or two R' groups together can be a $C_{1-10}$ hydrocarbyl substituted 1,3-butadiene; M is 1 or 2; and optionally, but preferably in the presence of an activating cocatalyst.

Particularly, suitable substituted cyclopentadienyl groups include those illustrated by the formula:

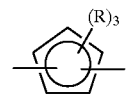

wherein each R is independently, each occurrence, H, hydrocarbyl, silahydrocarbyl, or hydrocarbylsilyl, containing up to 30 preferably from about 1 to about 20 more preferably from about 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexy, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)-bis-(2-methyl-4-phenylindenyl) zirconium di-$C_{1-4}$ alkoxide, or any combination thereof.

It is also possible to use the following titanium-based constrained geometry catalysts, [n-(1,1-dimethylethyl)-1,1-dimethyl-1-[(1,2,3,4,5-η)-1,5,6,7-tetrahydro-s-indacen-1-yl]silanaminato(2-)-n]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido)dimethylsilane titanium dimethyl, or any combination thereof.

Further preparative methods for the interpolymers used in the present invention have been described in the literature. Longo and Grassi *(Makromol. Chem.,* Volume 191, pages 2387 to 2396 [1990]) and D'Anniello et al. *(Journal of Applied Polymer Science,* Volume 58, pages 1701–1706 [1995]), the disclosure of which is incorporated herein by reference, reported the use of a catalytic system based on methylalumoxane (MAO) and cyclopentadienyltitanium trichloride ($CpTiCl_3$) to prepare an ethylene-styrene copolymer. Xu and Lin *(Polymer Preprints, Am. Chem. Soc., Div. Polym. Chem.)* Volume 35, pages 686,687 [1994]), the disclosure of which is incorporated herein by reference, have reported copolymerization using a $MgCl_2/TiCl_4/NdCl_3/Al$ $(iBu)_3$ catalyst to give random copolymers of styrene and propylene.

Lu et al *(Journal of Applied Polymer Science,* Volume 53, pages 1453 to 1460 [1994]), the disclosure of which is incorporated herein by reference, have described the copolymerization of ethylene and styrene using a Ticl$_4$/NdCl$_3$/MgCl$_2$/al(Et)$_3$ catalyst. Sernetz and Mulhaupt, (*Macromol. Chem. Phys.*, V. 197, pp. 1071–1083, 1997), the disclosure of which is incorporated herein by reference, have described the influence of polymerization conditions on the copolymerization of styrene with ethylene using Me$_2$Si(Me$_4$Cp)(n-tert-butyl)TiCl$_2$/Methylaluminoxane Ziegler-Natta catalysts. Copolymers of ethylene and styrene produced by bridged metallocene catalysts have been described by Arai, Toshiaki and Suzuki (*Polymer Preprints, Am.Chem.Soc., Div.Polym.Chem.*) Volume 38, pages 349, 350 [1997]) and in U.S. Pat. No. 5,652,315, issued to Mitsui Toatsu Chemicals, Inc., the disclosures of which are incorporated herein by reference.

The manufacture of α-olefin/vinyl aromatic monomer interpolymers such as propylene/styrene and butene/styrene are described in U.S. Pat. No. 5,244,996, issued to Mitsui Petrochemical Industries Ltd. or U.S. Pat. No. 5,652,315 also issued to Mitsui Petrochemical Industries Ltd. or as disclosed in DE 197 11 339 A1 to Denki Kagaku Kogyo KK, the disclosures of all three of which are incorporated herein by reference. Also, although can have a high isotacticity and therefore not preferred, the random copolymers of ethylene and styrene as disclosed in *Polymer Preprints*, Vol. 39, no. 1 March 1998 by Toru Aria et al., the disclosure of which is incorporated herein by reference, can also be employed as the ethylene polymer of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. Nevertheless, for the purpose of the present invention, it is preferred that no more than 30 weight percent, preferably less than 20 weight percent (based on the total weight of the interpolymers) of atactic vinyl aromatic homopolymer be is present.

The aromatic polyethers employed herein as component (B1) include, for example, the poly(phenylene ether) (PPE) thermoplastic engineering resins which are well known, commercially available materials produced by the oxidative coupling polymerization of alkyl substituted phenols. Typically, aromatic polyethers are linear, amorphous polymers having a glass transition temperature greater than 150° C. and preferably in the range of about 190° C. to about 235° C.

Preferred aromatic polyethers include those represented by the general formula:

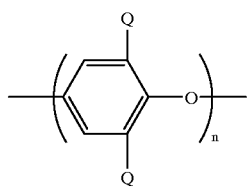

wherein Q is the same or different alkyl group having from about 1 to about 4 carbon atoms and n is a whole integer of at least 10, preferably at least 25, more preferably at least 100, and most preferably from about 150 to about 1200. Examples of preferred polymers are poly(2,6-dialkyl-1,4-phenylene ether) such as poly(2,6-dimethyl-1,4-phenylene ether), poly(2-methyl-6-ethyl-1,4-phenylene ether), poly(2-methyl-6-propyl-1,4-phenylene ether), poly-(2,6-dipropyl-1,4-phenylene ether) and poly (2-ethyl-6-propyl-1,4-phenylene ether). A more preferred polymer is poly(2,6-dimethyl-1,4-phenylene ether). Suitable aromatic polyethers (including aromatic polyethers formulated or blended with other polymers such as, for example, polyamides) are available from Asahi Chemical Inc. under the designation XYRON, BASF Chemical under the designations LURANYL and ULTRANYL, and General Electric Corporation under the designations NORYL, PPO and BLENDEX.

The polymers prepared from vinylidene aromatic monomers employed as component (B2) in the present invention include homopolymers of a single vinylidene aromatic monomer or interpolymers prepared from one or more vinylidene aromatic monomers. Particularly suitable for use as component (B2) of the present blends are monovinylidene aromatic polymers including homopolymers or interpolymers of one or more monovinylidene aromatic monomers, or an interpolymer of one or more monovinylidene aromatic monomers and one or more monomers interpolymerizable therewith other than an aliphatic α-olefin (excluding, for example, ethylene).

Suitable monovinylidene aromatic monomers are represented by the following formula:

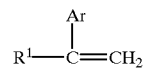

wherein $R^1$ is selected from the group of radicals consisting of hydrogen and hydrocarbyl radicals containing three carbons or less, and Ar is a phenyl group or a phenyl group substituted with from about 1 to about 5 substituents selected from the group consisting of halo, $C_1$–$C_4$ alkyl, and $C_1$–$C_4$ haloalkyl. Exemplary monovinylidene aromatic monomers include styrene, para-vinyl toluene, α-methylstyrene, t-butyl styrene, chlorostyrene, including all isomers of these compounds, etc. Styrene is a particularly desirable monovinylidene aromatic monomer for the monovinylidene aromatic polymers used in the practice of the present invention.

Examples of suitable interpolymerizable comonomers other than a monovinylidene aromatic monomer and an alpha-olefin monomer include $C_4$–$C_6$ conjugated dienes (especially butadiene or isoprene), N-phenyl maleimide, N-alkyl maleimide, acrylamide, ethylenically-unsaturated nitirile monomers (such as acrylonitrile and methacrylonitrile), ethylenically unsaturated mono- and difunctional carboxylic acids (such as acrylic acid, methacrylic acid) and derivatives thereof (such as esters and anhydrides, for example, $C_1$–$C_4$ alkylacrylates or methacrylates, such as n-butyl acrylate and methyl methacrylate, and maleic anhydride), and any combination thereof. In some cases it is also desirable to copolymerize a crosslinking monomer such as a divinyl benzene into the monovinylidene aromatic polymer.

The polymers of monovinylidene aromatic monomers with other interpolymerizable comonomers preferably contain, polymerized therein, at least 50 mole percent, preferably at least 60 mole percent, and more preferably at least 70 mole percent of one or more monovinylidene aromatic monomers.

Component (B2) may also be a rubber modified styrenic composition, particularly a flame resistant rubber modified styrenic composition. The flame resistant compositions are typically produced by adding flame retardants to a high impact polystyrene (HIPS) resin. The addition of flame retardants lowers the impact strength of the HIPS which is restored back to acceptable levels by the addition of impact modifiers, typically styrene-butadiene (SBS) block copolymers. The final compositions are referred to as ignition resistant polystyrene, IRPS. The IRPS compositions typically contain the following components:

Component (R) from about 50 to about 90 percent by weight based on total resin composition (R+S+T+U) of a rubber modified polymer derived from a vinyl aromatic monomer, such as, for example, high impact polystyrene (HIPS);

Component S) a sufficient amount of flame retardant additive, preferably a halogen-containing flame retardant to provide the composition (R+S+T+U) with 7 to 14 percent by weight halogen;

Component T) from about 2 to about 6 percent by weight based on total resin composition (R+S+T+U) of an inorganic flame retardant synergist; and Component U) from about 1 to about 8 percent by weight based on total resin composition (R+S+T+U) of an impact modifier.

Component R is a rubber modified vinyl aromatic polymer (for example, a rubber modified polystyrene composition). Suitable polymers include those made from vinyl aromatic monomers typically represented by the formula:

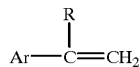

wherein R is hydrogen or methyl, Ar is an aromatic ring structure having from about 1 to about 3 aromatic rings with or without alkyl, halo, or haloalkyl substitution, wherein any alkyl group contains about 1 to about 6 carbon atoms and haloalkyl refers to a halogen substituted alkyl group. Preferably, Ar is phenyl or alkylphenyl with phenyl being most preferred. Typical vinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and mixtures thereof. The vinyl aromatic monomer may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate, maleic anhydride, maleimide, and phenylmaleimide.

Rubber modified vinyl aromatic polymers can be prepared by polymerizing the vinyl aromatic monomer in the presence of a predissolved rubber to prepare impact modified, or grafted rubber containing products, examples of which are described in U.S. Pat. Nos. 3,123,655; 3,346,520; 3,639,522; and 4,409,369, the disclosure of all of which are incorporated herein by reference. The rubber is typically a butadiene or isoprene rubber, preferably polybutadiene. Preferably, the rubber modified vinyl aromatic polymer is high impact polystyrene (HIPS).

The amount of rubber modified vinyl aromatic polymer used in the composition of the present invention is typically from about 50 to about 90, preferably from about 60 to about 88, more preferably from about 70 to about 85 and most preferably from about 72 to about 82 percent by weight based on total resin composition (R+S+T+U).

Component U is an impact modifier. Component U and impact modifier of (B2d) can be any polymer that increases the impact strength of the composition of the present invention. Typical impact modifiers include polybutadiene, polyisoprene, and copolymers of a vinyl aromatic monomer and a conjugated diene, such as, for example, styrene-butadiene copolymers, styrene-isoprene copolymers, including diblock and triblock copolymers. Still other impact modifiers include copolymers of a vinyl aromatic monomer with hydrogenated dienes and ethylene-acrylic acid copolymers. Preferably, the impact modifier is a styrene-butadiene-styrene triblock copolymer containing from 25 to 40 weight percent styrene component.

The amount of impact modifier used in the composition of the present invention is typically from about 1 to about 8, preferably from about 1 to about 7, more preferably from about 2 to about 6, and most preferably, especially with regard to (R+S+T+U), from about 2 to about 5 percent by weight of total resin composition.

Component S is a flame retardant which can any compound or mixture of compounds, preferably halogen-containing, which imparts flame resistance to the composition of the present invention. Suitable flame retardants are well-known in the art and include but are not limited to hexahalodiphenyl ethers, octahalodiphenyl ethers, decahalodiphenyl ethers, decahalobiphenyl ethanes, 1,2-bis (trihalophenoxy)ethanes, 1,2-bis(pentahalophenoxy) ethanes, hexahalocyclododecane, a tetrahalobisphenol-A, ethylene(N,N')-bis-tetrahalophthalimides, tetrahalophthalic anhydrides, hexahalobenzenes, halogenated indanes, halogenated phosphate esters, halogenated paraffins, halogenated polystyrenes, and polymers of halogenated bisphenol-A and epichlorohydrin, or mixtures thereof. Preferably, the flame retardant is a bromine or chlorine containing compound. In a preferred embodiment, the flame retardant is decabromodiphenyl ether or a mixture of decabromodiphenyl ether with tetrabromobisphenol-A.

The amount of flame retardant present within the composition of the present invention will depend upon specific flame retardant used. Typically, for halogen-containing flame retardants, the amount of flame retardant is chosen such that from about 7 to about 14, preferably from about 7 to about 13, more preferably from about 8 to about 12 and most preferably from about 9 to about 11 percent by weight of total resin composition (R+S+T+U) of halogen is present in the composition of the present invention.

Component T is an inorganic flame retardant synergist which are known in the art as compounds which enhance the effectiveness of flame retardants, especially halogenated flame retardants. Examples of inorganic flame retardant synergists include but are not limited to metal oxides, such as, for example, iron oxide, tin oxide, zinc oxide, aluminum trioxide, alumina, antimony tri- and pentoxide, bismuth oxide, molybdenum trioxide, and tungsten trioxide; boron compounds, such as zinc borate; antimony silicates; ferrocene and mixtures thereof.

The amount of inorganic flame retardant synergist present is typically from about 2 to about 6, preferably from about 2 to about 5, more preferably from about 2.5 to about 5, and most preferably from about 2.5 to about 4 percent by weight of total resin composition (R+S+T+U).

The optional impact modifier component (C) present in an amount of from 0 to about 50 weight percent, preferably from 0 to about 35 weight and more preferably from 0 to about 20 weight percent, based on the combined weights of components (A), (B) and (C), is at least one linear or crosslinked polymer selected from the group consisting of, but not limited to, natural rubber; polybutadiene; polyisoprene; random copolymers of a vinyl aromatic monomer and a conjugated diene, such as, for example, styrene-butadiene copolymers, styrene-isoprene copolymers; diblock and triblock copolymers of a vinyl aromatic monomer and a conjugated diene, for example, styrene-butadiene copolymers, styrene-isoprene copolymers, styrene-butadiene-styrene copolymers, styrene-isoprene-copolymers; hydrogenated random and block copolymers of a vinyl aromatic monomer with conjugated dienes; ethylene-acrylic acid copolymers and ethylene/($\alpha$-olefin copolymers.

Preferably (and especially the optional impact modifier), is a styrene-butadiene-styrene triblock copolymer containing from about 25 to about 40 weight percent styrene component, or ethylene/$\alpha$-olefin copolymers such as those commercially available from Dupont Dow Elastomers under the ENGAGE trademark.

The compositions of the present invention may also contain additives such as antioxidants (such as, hindered phenols, for example, IRGANOX® 1010), phosphites (such as IRGAFOS® 168)), thermal stabilizers, ignition resistance promoters, U.V. stabilizers, cling additives (such as polyisobutylene), mold release agents, slip agents, antiblock additives, plasticizers, flow promoters, such as waxes or mineral oil, processing aids, colorants, pigments, and fillers, and combinations thereof can also be included in the composition of the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from about 0.01 to about 10, preferably from about 0.05 to about 5, more preferably from about 0.1 to about 2 percent by weight based upon the weight of the polymer or polymer blend.

Similarly, the amounts of any of the other enumerated additives are the functionally equivalent amounts such as the required amount to render the polymer composition antiblocking, the amount to render the polymer composition ignition resistant, the desired amount of filler loading to produce the desired result, to provide the desired color from the colorant or pigment.

Some additives (especially organic phosphates such as aryl or alkyl phosphates and mixture thereof) may provide a dual role as both a processing aid and an ignition/flame retardant. For example, triphenyl phosphate and tricresyl phosphate can be utilized to impart processability and ignition resistance. Such additives can suitably be employed in the range of from about 0.05 to about 50, preferably from about 0.1 to about 35 more preferably from about 0.2 to about 20 percent by weight based upon the weight of the polymer blend composition. However, in the instance of fillers, they could be employed up to 90 percent by weight based on the weight of the polymer blend composition.

The inventive blend composition can be prepared by any suitable means known in the art which will result in a generally uniform dispersion of all ingredients throughout the resulting product. For example, dry blending of components in the desired proportions followed by melt mixing can suitably prepare the inventive composition. Illustrative melt mixing devices include Banbury mixers, compounding rolls, single screw extruders, twin screw extruders, and Haake mixers.

Due to mismatch in softening/fusion points typically existent between the interpolymers and aromatic polyethers, suitable technology may need to be considered for blend preparation. These considerations include the initial form of the aromatic polyether (such as pellets, powder, or dispersion) prior to blending to assure proper dispersion. The staging or sequential addition of the different formulation components, including, but not limited, to the interpolymer, aromatic polyether and other additives such as processing aids in the blending operation may be employed to ensure effective blending and dispersion. In another consideration, it may be relevant to better balance the melt rheology of the polymeric components by control of molecular weight or specifically using processing aids to ensure effective blending and dispersion. For example, good dispersion can be achieve for the interpolymer components and aromatic polyether components by providing a viscosity ratio between the components in the range of 1/100 to 100/1."

Additionally, the components of the inventive composition can be combined in an apparatus such as a dry blender before being fed into a mixing/melting extruder apparatus, or two or more of the ingredients may be pre-mixed and fed into a hot melt of the remaining components. The dry blended compositions may be directly melt processed into a final solid state article, for example, by injection molding, rotomolding, thermforming, pultrusion, or blow-molding, or by film inflation or casting.

The blends of the present invention can be utilized to produce a wide range of fabricated articles such as, for example but not limited to, calendered sheet, blown films, blow molded items and injection molded parts. The blends can also be used in the manufacture of fibers, foams and lattices. The blends of the present invention can also be utilized in adhesive formulations, as high heat elastomers and as toughened thermoplastics.

The following examples are illustrative of the invention, but are not to be construed as to limiting the scope thereof in any manner.

EXAMPLES

The properties of the polymers and blends were determined by the following test procedures:

Melt flow rate (MFR), $I_2$, was determined by ASTM D-1238, Condition 190° C./2.16 kg).

Differential scanning calorimetry (DSC) was performed using A Dupont DSC-2920 to measure the thermal transition temperatures and heat of transition for the interpolymers. In order to eliminate previous thermal histories, samples were first heated to 200° C. Heating and cooling curves were recorded at 10° C./min. Melting (from second heat) and crystallization temperatures were recorded from the peak temperatures of the endotherm and exotherm, respectively.

Tensile stress/strain properties of compression molded samples were measured using an Instron 1145 tensile machine equipped with an extensiometer. ASTM-D638 samples were tested at a strain rate of 5 $min^{-1}$. The average of four tensile measurements were taken. The yield stress and yield strain were recorded at the inflection point in the stress/strain curve. The energy at break was taken as the area under the stress/strain curve.

Thermomechanical Analysis (TMA) data were generated using a Perkin Elmer TMA 7 series instrument. The temperature for probe penetration to 1 mm depth on 2 mm thick compression molded parts using a heating rate of 5° C./min and a load of 1 Newton was used as a measure of upper service temperature.

Uniaxial tensile stress relaxation was evaluated using an Instron 1145 tensile machine. Compression molded film (~20 mil, 0.0508 cm., thick) with a 1" (2.54 cm) gauge length was deformed to a strain level of 50 percent at a strain rate of 20 min$^{-1}$. The force required to maintain 50 percent elongation was monitored for 10 min. The magnitude of the stress relaxation is defined as $(f_i-f_f/f_i)$ where $f_i$ is the initial force and $f_f$ is the final force.

Dynamic mechanical properties of compression molded samples were monitored using a Rheometrics 800E mechanical spectrometer. Samples were run in torsion rectangular geometry and purged under nitrogen to prevent thermal degradation. Typically, samples were run at a fixed forced frequency of 10 rad/sec using a torsional set strain of 0.05 percent, and collecting data isothermally at 4° C. intervals.

The polymers were prepared in a 400 gallon agitated semi-continuous batch reactor. The reaction mixture consisted of approximately 250 gallons of a solvent comprising a mixture of cyclohexane (85 weight percent) and isopentane (15 weight percent), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the desired run temperature and the catalyst components Titanium:(N-1,1-dimethylethyl)dimethyl(1-(1,2,3,4,5-η)-2,3,4,5-tetramethyl- 2,4-cyclopentadien-1-yl)silanaminato))(2-)N)-dimethyl, CAS# 135072-62-7 and Tris(pentafluoro-phenyl) boron, CAS# 001109-15-5, and Modified methylaluminoxane Type 3A, CAS# 146905-79-5 were flow controlled, on a mole ratio basis of 1/3/5 respectively, combined and added to the vessel. After starting, the polymerization was allowed to proceed with ethylene supplied to the reactor as required to maintain vessel pressure. In some cases, hydrogen was added to the headspace of the reactor to maintain a mole ratio with respect to the ethylene concentration. At the end of the run, the catalyst flow was stopped, ethylene was removed from the reactor, 1000 ppm of Irganox™ 1010 antioxidant was then added to the solution and the polymer was isolated from the solution. The resulting polymers were isolated from solution by steam stripping. In the case of the steam stripped material, additional processing was required in a devolatilizing extruder to reduce residual moisture and any unreacted styrene monomer. Table I reports the preparation conditions and Table 2 report the resultant product properties.

TABLE 2

| Interpolymer | Total* Percent Styrene in Polymer (wt percent) | Copolymerized Styrene Content (mol percent)+ | atactic PS (wt percent)+ | Talc Level (wt percent) cc | Melt Index $I_2$ g/10 min |
|---|---|---|---|---|---|
| ES-1 | 81.7 | 37.9 | 8.6 | <2.5 | 0.18 |
| ES-2 | 48.3 | 19.5 | 3.7 | <1.0 | 0.01 |
| ES-3 | 81.6 | 38.4 | 8.2 | <2.0 | 1.80 |

*Percent styrene measured via Fourier Transform Infrared (FTIR) technique, includes atactic polystyrene contribution.
+Measured using $^{13}$C-NMR.

Examples 1–4

The ethylene/styrene interpolymers (component A) employed in these examples were those designated ES-1 and ES-2 in Tables 1 and 2.

The aromatic polyether (component B1) employed was a polyphenylene ether, poly(2,6-dimethyl-1,4-phenylene ether), commercially available from General Electric Company under the designation PPO-G and as having a glass transition temperature, $T_g$, of 220° C. as measured by differential scanning calorimetry (DSC).

The polymer of an aromatic vinylidene monomer (component B2) employed was polystyrene commercially available from The Dow Chemical Company under the designation STYRON™685.

The blends were prepared by melt compounding components mixed in specified weight ratios using a Haake mixer equipped with a Rheomix 3000 bowl and operated at 240° C. and 40 rpm. The capacity of this mixer was 310 cubic centimeters (cc). Optimum volume for effective mixing was approximately 70 percent by volume or 220 cc. Calculations were made considering density and constituency of each component to prepare a dry blend of the materials to achieve a 70 percent volume fill. Separately for each sample, the dry blended materials were then added stepwise into the preheated calibrated bowl as the rotors were turning at 40 rpm. After a small melt heel was established in the mixer, small increments of the dry blend mixture were added and allowed to melt and incorporate into the heel before more dry blended material was added. This continued for approximately three minutes until all the dry blended material was added. A sealing ram was then lowered onto the melt bowl and the molten blend was allowed to mix by roller blade action for an additional ten minutes. At the end of this time, the rotors were stopped, the mixer was dismantled, and the melt blend was removed and allowed to cool for subsequent testing and analysis.

Test parts and characterization data for the interpolymers and their blends are generated according to the following procedures:

TABLE 1

| Interpolymer | Solvent loaded | | Styrene loaded | | Pressure | | Temp. | Total $H_2$ Added | Run Time | Polymer in Solution |
|---|---|---|---|---|---|---|---|---|---|---|
| | lbs. | kg | lbs. | kg | Psig | kPa | ° C. | Grams | Hours | Wt. Percent |
| ES-1 | 252 | 114 | 1,320 | 599 | 42 | 290 | 60 | 0 | 2.8 | 11.5 |
| ES-2 | 842 | 382 | 662 | 300 | 105 | 724 | 60 | 8.8 | 3.7 | 8.6 |
| ES-3 | 252 | 114 | 1320 | 599 | 40 | 276 | 60 | 23 | 6.5 | 18.0 |

Samples were compression molded by melting samples at 240° C. for 3 minutes and compression molding the samples using 5 in×5 in×0.08 in (12.7 cm×12.7 cm×0.20 cm) plaques at 204° C. under 20,000 lb. (9,080 kg) of pressure for another 2 minutes. Subsequently, the molten materials were quenched in a press equilibrated to room temperature. Tables 3 and 4 report the blend component weight percentages and the property data for the various examples. Table 5 reports the modulus temperature data from dynamic mechanical spectroscopy (DMS) testing.

TABLE 3

| Example | Component (A), wt percent | Component (B1) (PPO-G), wt percent | Component (B2) (Styron ™ 685), wt percent | Young's Modulus MPa | Percent Elongation at Break |
|---|---|---|---|---|---|
| Comp. A* | ES-1/100 | 0 | 0 | 610 | 282 |
| Comp. B* | ES-2/100 | 0 | 0 | 7.6 | 408 |
| Comp. C* | ES-3/100 | 0 | 0 | 703 | 248 |
| Comp. D* | 0 | 0 | 100 | 1860 | 1.6 |
| Comp. E* | ES-3/70 | 0 | 30 | 1203 | 184 |
| Inv. Ex 1 | ES-1/70 | 30 | 0 | 1,305 | 54 |
| Inv. Ex 2 | ES-1/70 | 15 | 15 | 989 | 136 |
| Inv. Ex 3 | ES-2/70 | 30 | 0 | 49 | 183 |
| Inv. Ex 4 | ES-2/15 | 15 | 15 | 77 | 167 |

*Not an example of the invention; provided for purposes of comparison only.

TABLE 4

| Example | Yield Stress MPa | Stress at Break MPa | Energy at Break Nm | Upper Service Temp. ° C. (TMA) | Percent Stress Relaxation | Tg (DMS) ° C. | Tg (DSC) ESI Phase ° C. | Tg (DSC) PPO Phase ° C. |
|---|---|---|---|---|---|---|---|---|
| Comp. A* | 15.2 | 20.2 | 103.1 | 81 | 93 | 30 | 24 | N/A |
| Comp. B* | 1.5 | 4.6 | 70.5 | 72 | 26 | -2 | -13 | N/A |
| Comp. C* | 7.5 | | 98.2 | 65 | 93 | 30 | 24 | N/A |
| Comp. D* | 39.0 | 39.0 | 1.1 | N/M | cbm | 106 | | N/A |
| Comp. E* | 9.9 | | 97.4 | N/M | 86 | 30 | 24 | N/A |
| Inv. Ex 1 | 48.9 | 26.9 | 43.4 | 107 | N/M | 41 | 28 | ≈177 |
| Inv. Ex 2 | 27.9 | 23.2 | 88.8 | 97 | 81 | 35 | 26 | 139 |
| Inv. Ex 3 | 5.2 | 20.2 | 67.8 | 95 | N/M | -3 | -12 | ≈185 |
| Inv. Ex 4 | 7.1 | 19.3 | 69.2 | 103 | N/M | -3 | -13 | 144 |

*Not an example of the invention; provide for purposes of comparison only.
cbm denotes the percent stress relaxation could not be measured for the example.

TABLE 5

| Example | G' 60° C.) Dyne/cm$^2$ | G' (120° C.) Dyne/cm$^2$ | G' (60° C.)/ G' (120° C.) |
|---|---|---|---|
| Comp. B* | 8.65 × 10$^6$ | 1.10 × 10$^6$ | 7.86 |
| Comp. C* | 2.35 × 10$^7$ | <10$^6$ | <23.5 |
| Comp. E* | 1.17 × 10$^8$ | 4.71 × 10$^6$ | 24.8 |
| Inv. Ex 1 | 2.39 × 10$^8$ | 4.25 × 10$^7$ | 5.62 |
| Inv. Ex 2 | 1.58 × 10$^8$ | 6.58 × 10$^7$ | 2.40 |
| Inv. Ex 3 | 1.42 × 10$^8$ | 4.85 × 10$^7$ | 2.93 |
| Inv. Ex 4 | 2.29 × 10$^8$ | 1.35 × 10$^8$ | 1.70 |

*Not an example of the invention; provided for purposes of comparison only.

The examples of the present invention are numbered Inventive Examples 1–4. These data show that the ES interpolymers have an unexpected high level of compatibility with aromatic polyethers (component B1) when used alone or in combination with an aromatic vinylidene polymer, polystyrene (component B2). In particular, dynamic mechanical testing of the ES-1 interpolymer blends (Inventive Examples 1 and 2) showed significant shifting and broadening of the glass transition relative to the unblended interpolymer, which is evidence of good interaction between the blend components. No similar shift in the glass transition for the interpolymer was found for comparative example blend E, which contained polystyrene as the sole blend component.

The unexpected high compatibility for the inventive blends translated into thermoplastic polymeric materials having good mechanical properties, as evidenced by a high tensile elongation at rupture. The particular examples illustrate the ability to engineer a material with high upper service temperature, and having a relatively small modulus change over an extended temperature range. A measure of this is given by the ratio of $G'_{(60° C.)}/G'_{(120° C.)}$ as reported in Table 5. The lower this ratio, the lower the sensitivity of modulus to temperature. The upper service temperature can be controlled by the weight ratio of blend components, especially PPO/PS ratio, and the plateau modulus of the composition can be controlled by the ratio of Interpolymer component (A) to component (B). The inventive three component blends, Inventive Examples 2 and 4, showed the least modulus temperature sensitivity.

What is claimed is:

1. A blend of polymeric materials having improved high temperature serviceability consisting essentially of
    (A) from about 1 to about 99 weight percent based on the combined weight of components (A) and (B) of at least one interpolymer produced from polymerizing a monomer mixture comprising:
        (1) from about 5 to about 65 mole percent of (a) at least one vinylidene aromatic monomer, or (b) a combination of at least one vinylidene aromatic monomer and at least one hindered aliphatic vinylidene monomer, and
        (2) from about 35 to about 95 mole percent of at least one aliphatic α-olefin having from about 2 to about 20 carbon atoms; and
    (B) from about 1 to about 99 weight percent based on the combined weight of components (A) and (B) of a composition comprising:
        (1) from about 1 to about 100 weight percent based on the combined weight of components (B1) and (B2) of an aromatic polyether; and
        (2) from 0 to about 99 weight percent based on the combined weight of components (B1) and (B2) of
            (a) at least one homopolymer of a vinylidene aromatic monomer, or (b) at least one interpolymer of one or more vinylidene aromatic monomers, or (c) at least one interpolymer of at least one vinylidene aromatic monomer and at least one hindered aliphatic vinylidene monomers, or (d) at least one of (B1) or (B2)(a–c) further comprising an impact modifier, or (e) a combination of any two or more of (B1) and (B2)(a–d), (C) from 0 to about 50 weight percent of at least one optional impact modifier which is a linear or crosslinked polymer or copolymer selected from the group consisting of natural rubber; polybutadiene; polyisoprene; random copolymers of a vinyl aromatic monomer and a conjugated diene; diblock and triblock copolymers of a vinyl aromatic monomer and a conjugated diene; hydrogenated random and block copolymers of a vinyl aromatic monomer with conjugated dienes; ethylene-acrylic acid copolymers and ethylene/α-olefin copolymers, and (D) from 0 to about 50 weight percent of at least one optional processing aid wherein the blend composition is characterized as having a ratio of G'(60° C.) to G'(120°) of less than or equal to 5.62, as determined using a dynamic mechanical spectrometer.

2. A blend of claim 1, wherein the at least one interpolymer component (A) is produced from polymerizing a monomer mixture comprising:

(1) from about 5 to about 55 mole percent of (a) at least one vinylidene aromatic monomer, or (b) a combination of at least one vinylidene aromatic monomer and at least one hindered aliphatic vinylidene monomer, and (2) from about 45 to about 95 mole percent of at least one aliphatic α-olefin having from about 2 to about 20 carbon atoms; and the aromatic polyether component (B1) comprises the structure

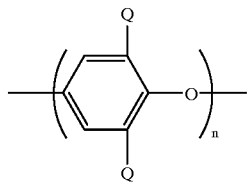

wherein Q is the same or different alkyl groups having from about 1 to about 4 carbon atoms and n is a whole integer of at least 25.

3. A blend of claim 1, wherein the at least one interpolymer component (A) is produced from polymerizing a monomer mixture comprising:

(1) from about 10 to about 50 mole percent of at least one vinylidene aromatic monomer, and (2) from about 50 to about 90 mole percent of ethylene or ethylene and at least one aliphatic α-olefin having from about 3 to about 8 carbon atoms.

4. A blend of claim 1 wherein the at least one interpolymer component (A) is produced from polymerizing a monomer mixture comprising:

(1) from about 10 to about 50 mole percent of styrene, and (2) from about 50 to about 90 mole percent of ethylene or ethylene and at least one selected from propylene, isobutylene, 1-butene, 1-pentene, 1-hexene, 1-heptene, 4-methyl-1-pentene, 1-heptene, 1-octene and norbornene; and component (B1) is poly(2,6-dimethyl-1,4-phenylene ether); and component (B2) is a homopolymer of styrene or a copolymer of styrene and butadiene.

5. A blend of claim 1 wherein component (A) is employed in an amount of from about 5 to about 50 weight percent, based on the combined weight of components (A) and (B); and component (B) is employed in an amount of from 50 to 95 weight percent, based on the combined weight of components (A) and (B).

6. A blend of claim 1 wherein component (A) is employed in an amount of from about 50 to about 95 weight percent, based on the combined weight of components (A) and (B); and component (B) is employed in an amount of from 5 to 50 weight percent, based on the combined weight of components (A) and (B).

7. A blend of claim 4 wherein the at least one interpolymer component (A) is produced from polymerizing a monomer mixture comprising ethylene and styrene, component (B1) is poly(2,6-dimethyl-1,4-phenylene ether), and component (B2) is polystyrene.

8. A blend of claim 4, wherein the impact modifier component (C) is at least one selected from diblock styrene-butadiene copolymers and styrene-isoprene copolymers; triblock copolymers of styrene-butadiene-styrene copolymers, styrene-isoprene-copolymers; hydrogenated random and block copolymers of a vinyl aromatic monomer with conjugated dienes; and ethylene-α olefin copolymers.

9. An adhesive or sealant composition containing a blend of claim 1.

10. A sheet or film resulting from calendering, casting or blowing a blend of claim 1.

11. An article resulting from injection, compression, extrusion or blow molding a blend of claim 1.

12. A fiber, foam or latex prepared from a blend of claim 1.

13. The blend of claim 1 wherein the component (A) is manufactured using a constrained geometry catalyst system.

* * * * *